(12) United States Patent
Perry et al.

(10) Patent No.: US 11,414,217 B2
(45) Date of Patent: Aug. 16, 2022

(54) LARGE REFLECTOR INFLATABLE SPACE-BASED TELESCOPE

(71) Applicant: Southwest Research Institute, San Antonio, TX (US)

(72) Inventors: William Dean Perry, Helotes, TX (US); Ira Steve Smith, Jr., Utopia, TX (US)

(73) Assignee: Southwest Research Institute, San Antonio, TX (US)

( * ) Notice: Subject to any disclaimer, the term of this patent is extended or adjusted under 35 U.S.C. 154(b) by 396 days.

(21) Appl. No.: 16/743,264

(22) Filed: Jan. 15, 2020

(65) Prior Publication Data

US 2021/0214106 A1 Jul. 15, 2021

(51) Int. Cl.
*B64G 1/22* (2006.01)
*B64G 1/10* (2006.01)
*G02B 23/02* (2006.01)
*G02B 26/08* (2006.01)

(52) U.S. Cl.
CPC ............... *B64G 1/22* (2013.01); *B64G 1/10* (2013.01); *G02B 23/02* (2013.01); *G02B 26/0825* (2013.01); *B64G 2001/224* (2013.01)

(58) Field of Classification Search
CPC ...... B64G 1/22; B64G 1/10; B64G 2001/224; G02B 23/02; G02B 26/0825; G02B 23/06
See application file for complete search history.

(56) References Cited

U.S. PATENT DOCUMENTS

| | | | | |
|---|---|---|---|---|
| 2,814,038 A * | 11/1957 | Miller | ............. | H01Q 19/12 343/915 |
| 7,224,322 B1 * | 5/2007 | Ghaleb | ............. | H01Q 19/17 343/915 |
| 7,997,264 B2 * | 8/2011 | Sankrithi | ............. | F24S 80/50 126/697 |
| 8,021,122 B2 * | 9/2011 | Clayton | ............. | H01Q 1/081 417/18 |
| 9,391,373 B2 * | 7/2016 | Ehrenberg | ............. | H01Q 15/163 |
| 10,199,711 B2 * | 2/2019 | Walker | ............. | H01Q 15/163 |
| 10,938,117 B2 * | 3/2021 | Walker | ............. | H01Q 15/161 |
| 2004/0207566 A1 * | 10/2004 | Essig, Jr. | ............. | F21S 11/00 343/878 |
| 2009/0067027 A1 * | 3/2009 | Hennigan | ............. | G02B 1/06 359/422 |
| 2010/0229850 A1 * | 9/2010 | Sankrithi | ............. | H01L 31/0543 126/684 |
| 2014/0368939 A1 * | 12/2014 | Andreasen | ............. | G02B 26/0825 356/610 |
| 2015/0020865 A1 * | 1/2015 | Xiao | ............. | G02B 19/0042 136/246 |
| 2017/0256840 A1 * | 9/2017 | Walker | ............. | H01Q 1/082 |
| 2018/0073772 A1 * | 3/2018 | Wang | ............. | F24S 50/20 |

* cited by examiner

*Primary Examiner* — Justin M Benedik
(74) *Attorney, Agent, or Firm* — Livingston Law Firm

(57) ABSTRACT

A large reflector inflatable telescope. The telescope has an inflatable hull with a conical lower portion and a hemispherical upper portion. The conical portion is transparent to electromagnetic waves so that radio or light waves can reach an inner reflector, which is interposed between the conical portion and the hemispherical portion. The presence of the inner reflector allows the conical portion and the hemispherical portion to be inflated at different pressures such that the reflector becomes spherical or parabolic. If desired, the reflector can be made adjustable with a membrane behind the reflector that provides electro-static force to shape the reflector.

20 Claims, 9 Drawing Sheets

LARGE REFLECTOR INFLATABLE SPACE-BASED TELESCOPE

TECHNICAL FIELD OF THE INVENTION

This invention relates to telescopes used in outer space, and more particularly to inflatable space-based telescopes.

BACKGROUND OF THE INVENTION

"Space-based telescopes" are referred to as such because they are located in outer space, above the earth's atmosphere and where radio or light signals cannot be masked or distorted. They can be used to transmit or receive electromagnetic energy for a variety of applications, such as communications, remote sensing, and astronomy.

Reflector space-based telescopes use a reflector to gather and focus light or radio waves. The objects from which (or to which) light or radio is received or transmitted are sufficiently distant that the rays coming from (or to) them are parallel rays. The reflector has a shape that will concentrate energy into the receiver, which has optics to correct the focus of the spot or image that hits the detector.

Inflatable space-based telescopes allow a much large reflector than is possible for space telescopes made from metal and glass. These larger reflectors can gather more energy, thus providing a much stronger signal or image to the receiver and allowing the telescope to sense signals that are fainter from a source at a great distance. These very large reflector telescopes can be compacted and carried on present launch vehicles and then inflated once they are in orbit. Lightweight, flexible, and inflatable materials allow reflector telescopes with a much larger reflector area than is possible with traditional steel and glass materials on space-based telescopes.

Inflatables are less expensive, can be tightly packed into small canisters, and are lower mass, allowing launches on smaller and less expensive launch vehicles.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to an inflatable space-based reflector telescope. The telescope has a lightweight hull and reflector, all of which are made from thin plastic film and are folded for launch. When the telescope is deployed, its hull supports the reflector inside the hull. When folded for launch, the telescope fits into the space available on present launch vehicles.

Applications of the telescope described herein are broad for both radio and optical wavelengths. Examples of applications are communications, remote sensing, and astronomy. In the case of radio applications, the telescope is not necessarily used for imaging. Examples of radio applications that do not require imaging sensors and optics are signal frequency and amplitude detection for various science, communications, or remote sensing applications.

Space-Based Telescope with Inflatable Hull and Reflector

Figure 1:
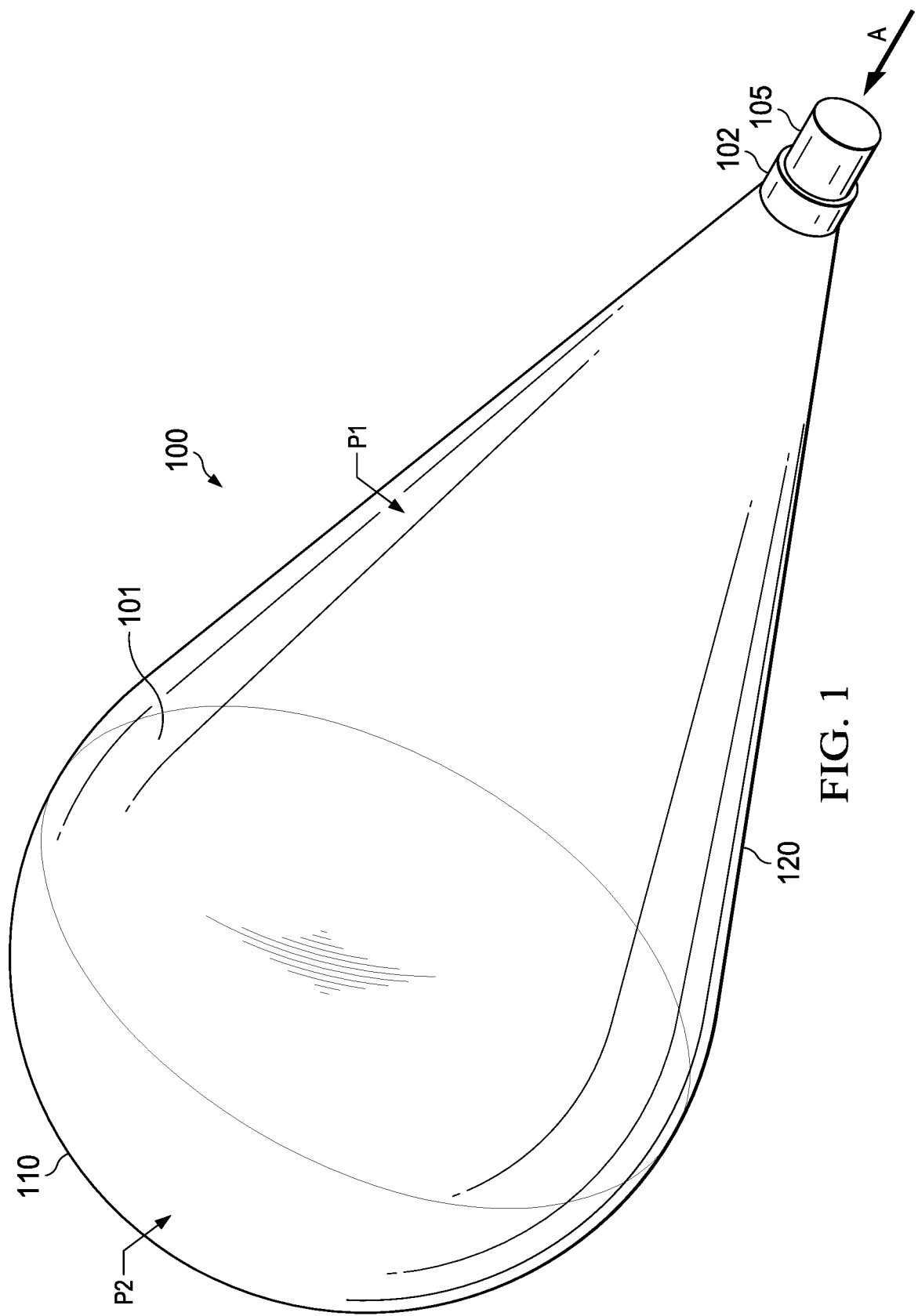
FIG. 1 is a perspective view of the telescope, viewed toward the top of the telescope.
Figure 2:
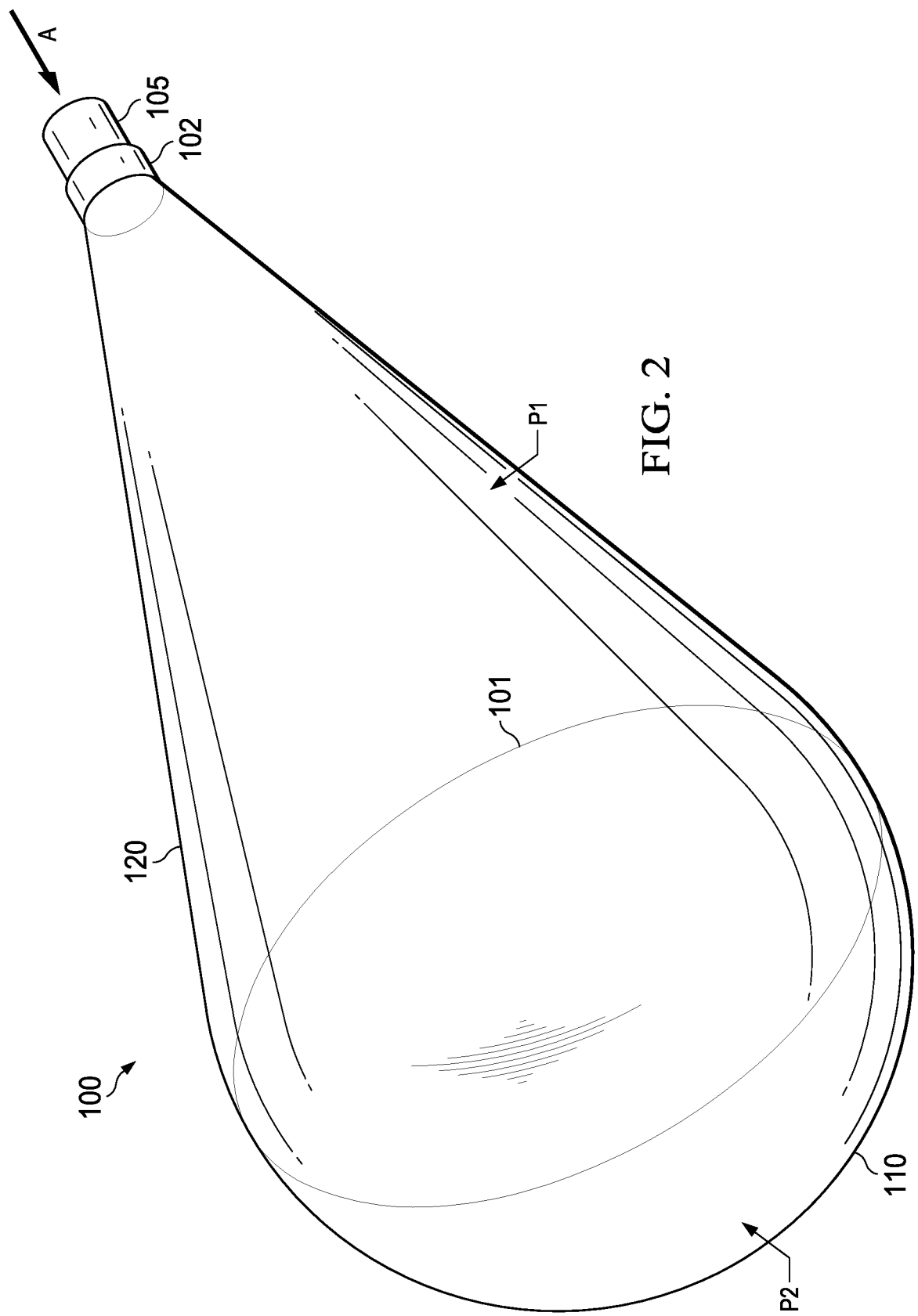
FIG. 2 is a perspective view of the telescope, viewed toward the bottom (receiver end) of the telescope.
Figure 3:
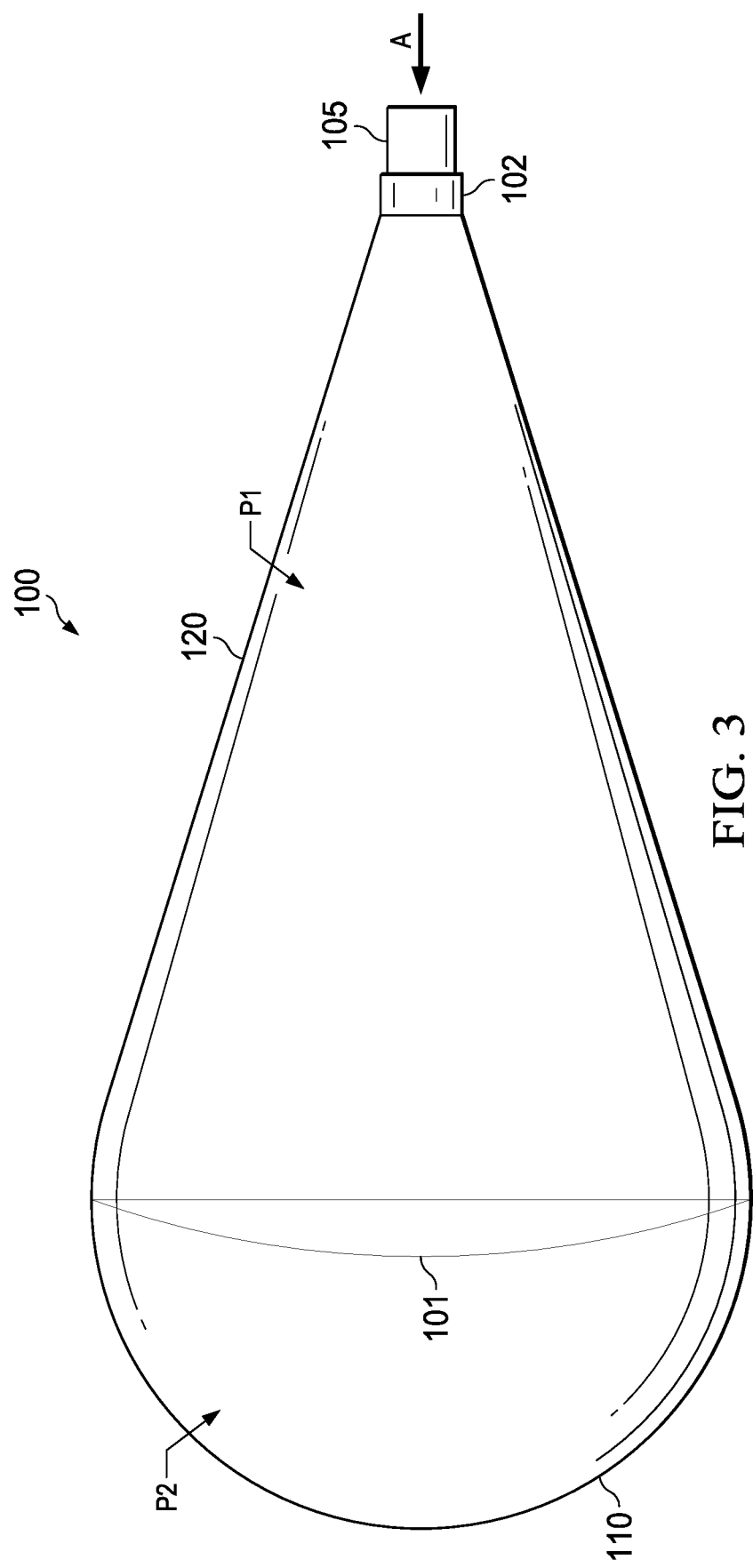
FIG. 3 is a side view of the telescope.

FIGS. 1-3 illustrate a space-based reflector telescope 100 having an inflatable hull with two portions 110 and 120 and a reflector 101 in accordance with the invention. As explained below, the two hull portions 110 and 120 are conjoined to effectively form a single hull with an internal reflector 101.

Telescope 100 is shown in its inflated (deployed) state. As explained below, for receiving applications, electromagnetic signals reach reflector 101 from Direction A and are reflected into the receiver 102.

FIG. 1 is a perspective view, looking from receiver 102 toward reflector 101, in other words, from the bottom to the top of the telescope. FIG. 2 is a perspective view, looking from the spherical top of hemispherical hull 110 toward receiver 102, in other words, from the top of the telescope to its bottom. FIG. 3 is a side view.

The external hull of telescope 100 is an inflated hemispherical hull portion 110 joined to an inflated conical hull portion 120. Both hull portions 110 and 120 are made from thin plastic film and may be folded flat into a compact package when not inflated. Both hull portions 110 and 120 are "patterned" in the sense that they take their hemispherical and conical shapes respectively, when inflated. A gore-type or a one-piece construction are possible patterns for either or both hull portions, and it may be possible to form the film to acquire its desired shape in a single piece.

At the junction of the two hull portions 110 and 120, an internal reflector 101 is joined to the external hull portions. In other words, reflector 101 is the shared top of conical hull portion 120 and bottom of hemispherical hull portion 110. The bottom surface of reflector 101 (facing into the conical hull portion) is reflective. Like hull portions 110 and 120, reflector 101 is made from thin plastic film and may be folded up along with the hull.

The interior of the conical envelope inside hull portion 120 is maintained at a first pressure P1. The interior of the conical envelope inside hull portion 110 is maintained at a second pressure P2. A small differential pressure is maintained, with P1 greater than P2, which causes reflector 101 to maintain its dish shape.

Reflector 101 may be spherical or parabolic. It is made from a thin metalized film, patterned to have its desired shape when hull portions 110 and 120 are inflated to desired pressures. Deviations in the reflector surface resulting from loads and thermal variations can be corrected with correction optics of receiver 102, using techniques know in the art of reflector telescopes. Also, as explained below in connection with FIGS. 6-9, a modified version of the telescope has an adjustable reflector.

The film for conical hull portion 120 is transparent to at least a targeted signal frequency. Films suitable for hull portions 110 and 120 are known in the field of space balloons. Films are available that are transparent to all but the highest electromagnetic signal frequencies.

In most cases, telescope 100 is designed for a narrow electromagnetic frequency band that can be anywhere from the MHz radio range thru the visible light range. For broadband applications, (broadband light telescope), selection of sensors for receiver 102 and film and reflector materials is more difficult due to the broader frequency range. In some cases, this might require the use of multiple sensors, each designed to receive a selected bandwidth of the electromagnetic spectrum.

Receiver 102 has appropriate sensing devices for receiving the light or radio signals reflected from reflector 101. For light signals, receiver 102 has imaging sensors and correction optics. Receiver 102 further may have processing and communications equipment for processing and communicating the signals. For transmit applications, receiver 102 is replaced with appropriate transmitting equipment. For purposes of the inventive aspects of this description, the terms receiver/transmitter may be used interchangeably and equivalently to mean a "receiver" that receives electromagnetic waves reflected from the reflector and/or transmits electromagnetic waves to be reflected off the reflector.

Referring in particular to FIG. 3, the outer profile of the entire hull of the telescope can be viewed as an open-bottomed hemispherical portion atop an open-topped conical portion. The "hemisphere" need not be exactly hemispherical, and the "cone" need not be exactly conical, but rather these terms are meant as general descriptions of the hull shape. The reflector 101 divides these two portions, making them inflatable at different pressures.

Figure 4:
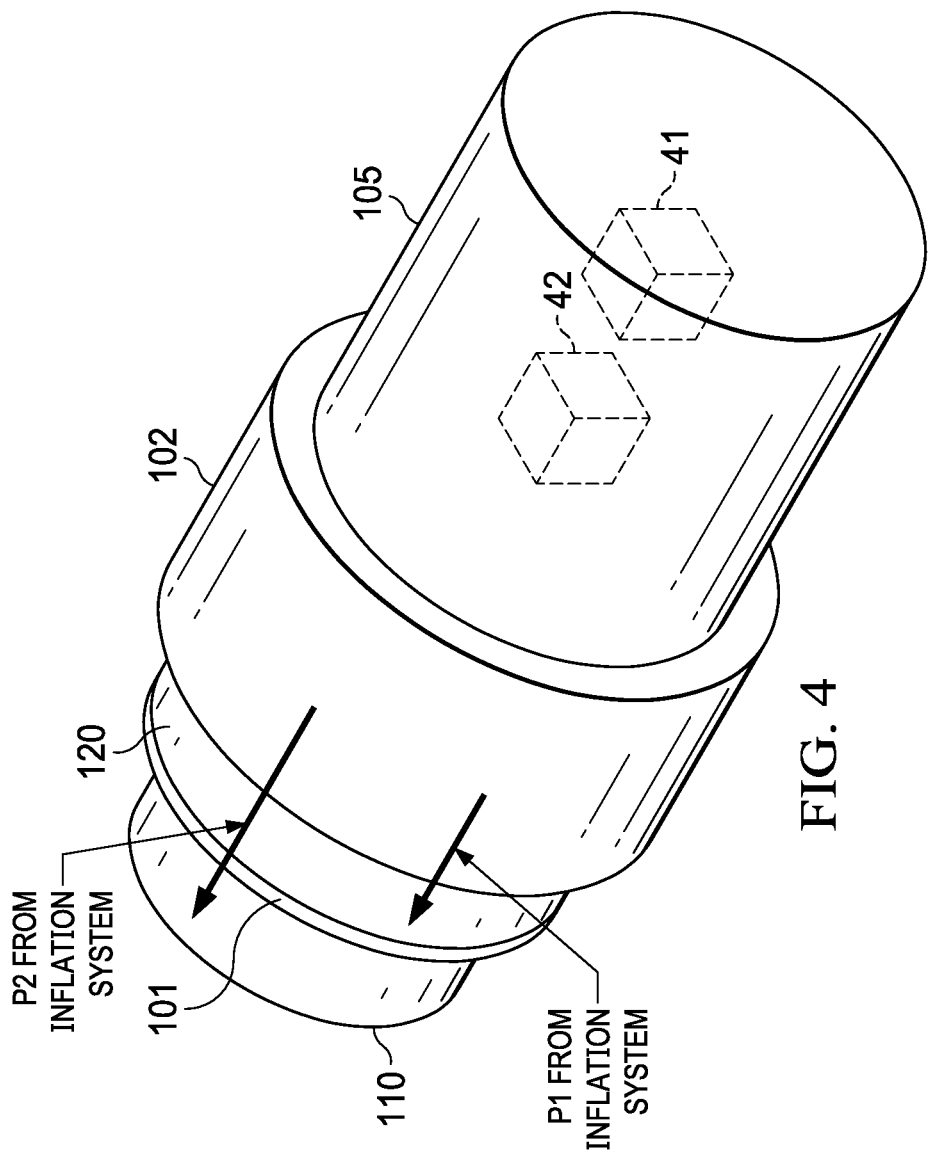
FIG. 4 illustrates the undeployed telescope, with its receiver and spacecraft.

FIG. 4 illustrates telescope 100 in its undeployed (uninflated) state, attached to spacecraft 105.

Spacecraft 105 may be any spacecraft capable of carrying telescope 100 (in its undeployed state), corrective optics and receiver 102, and any peripheral controllers or other equipment into space.

Hull portions 110 and 120 are compactly folded and packed. The exact configuration of the undeployed elements of telescope 100 in or on spacecraft 105 are not important to the invention. However, hull portions 110 and 120 are configured so that they can be inflated at two different pressures, with no fluid communication between them, so that their shape and the shape of reflector 101 can be maintained as described above.

To this end, spacecraft 105 carries an inflation system 41, which has a pressure tank for storing and delivering an inflation gas used to inflate hull portions 110 and 120. The inflation gas could be originally stored as a gas, or it could be obtained from a store of a liquid or solid that is turned to a gas. Two conduits, one to each hull portion, allow the hull portions to be inflated at different pressures. Deployment and inflation are controlled by an on-board controller 42 after the spacecraft reaches the target orbit.

Inflation of hull portions 110 and 120 is performed by providing a larger pressure inside each hull portion 110 and 120 than exists in space. Each hull portion expands until the force due to outside pressure (nearly zero in space) plus the stress force of the balloon material (the force with which the balloon pushes in on the gas inside), equals the pressure force of the inside gas.

Hull portions 110 and 120 are each inflated to a tension sufficient to provide structure that is stiff in bending and torsion to support reflector 101. Once inflated, the balloon-like telescope will float weightlessly.

Coarse pointing of the field of view of telescope 100 is achieved with the spacecraft's thrusters. Fine pointing may be achieved two ways: with optics of the receiver 102, or with electro-static adjustment to the shape of reflector 101 as described below.

Figure 5:
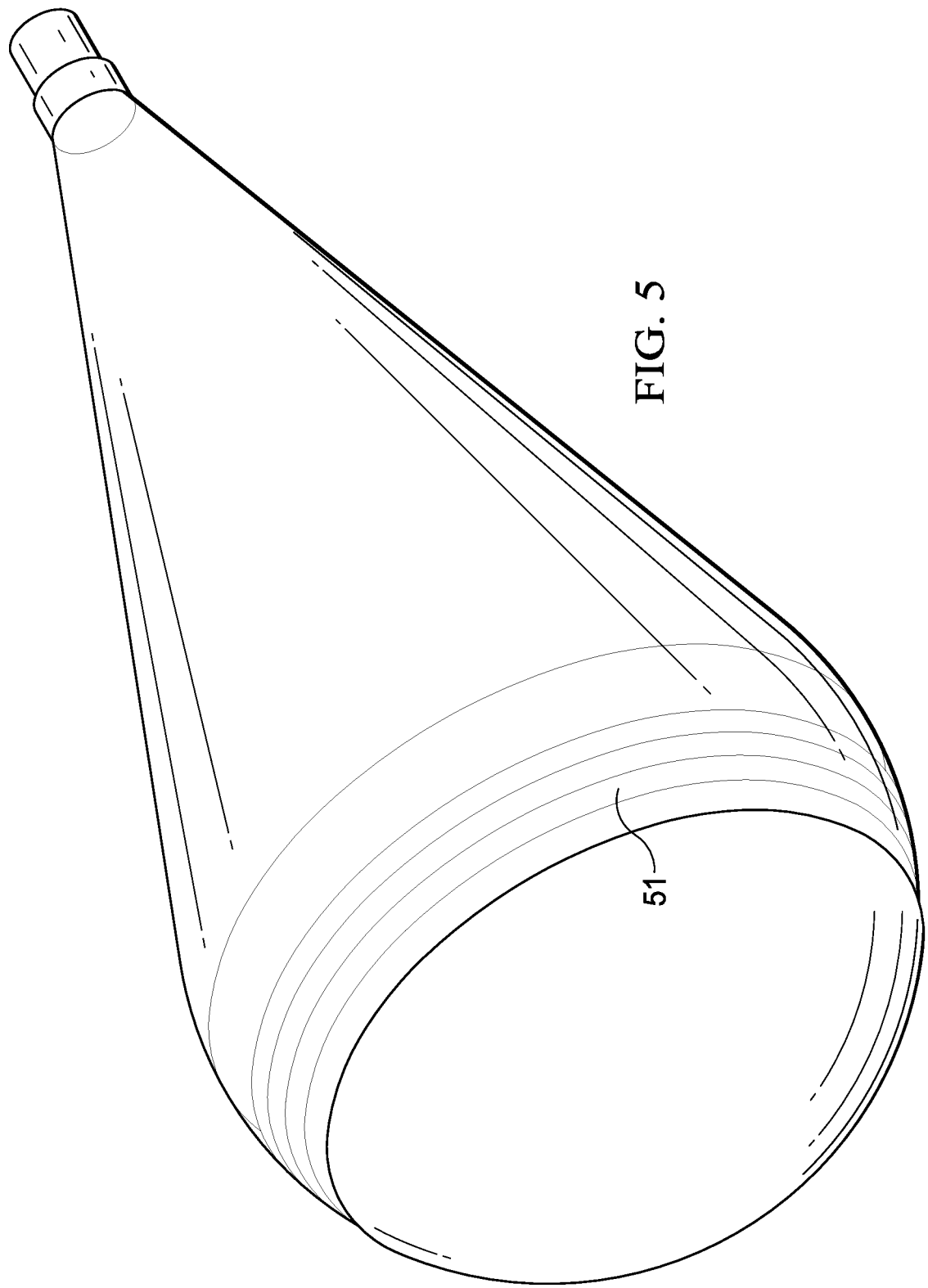
FIG. 5 illustrates the telescope with an optional sun shield at the top of the telescope.

FIG. 5 illustrates the telescope of FIG. 1, but with an optional sun shield 51. Sun shield 51 comprises one or more layers of a thin metalized film, forming a multi-layered solar barrier behind reflector 101. Sunshield 51 is internal to hemispherical hull portion 110 and can comprise one or more solar reflective diaphragms separated by gaps between them.

Figure 6:
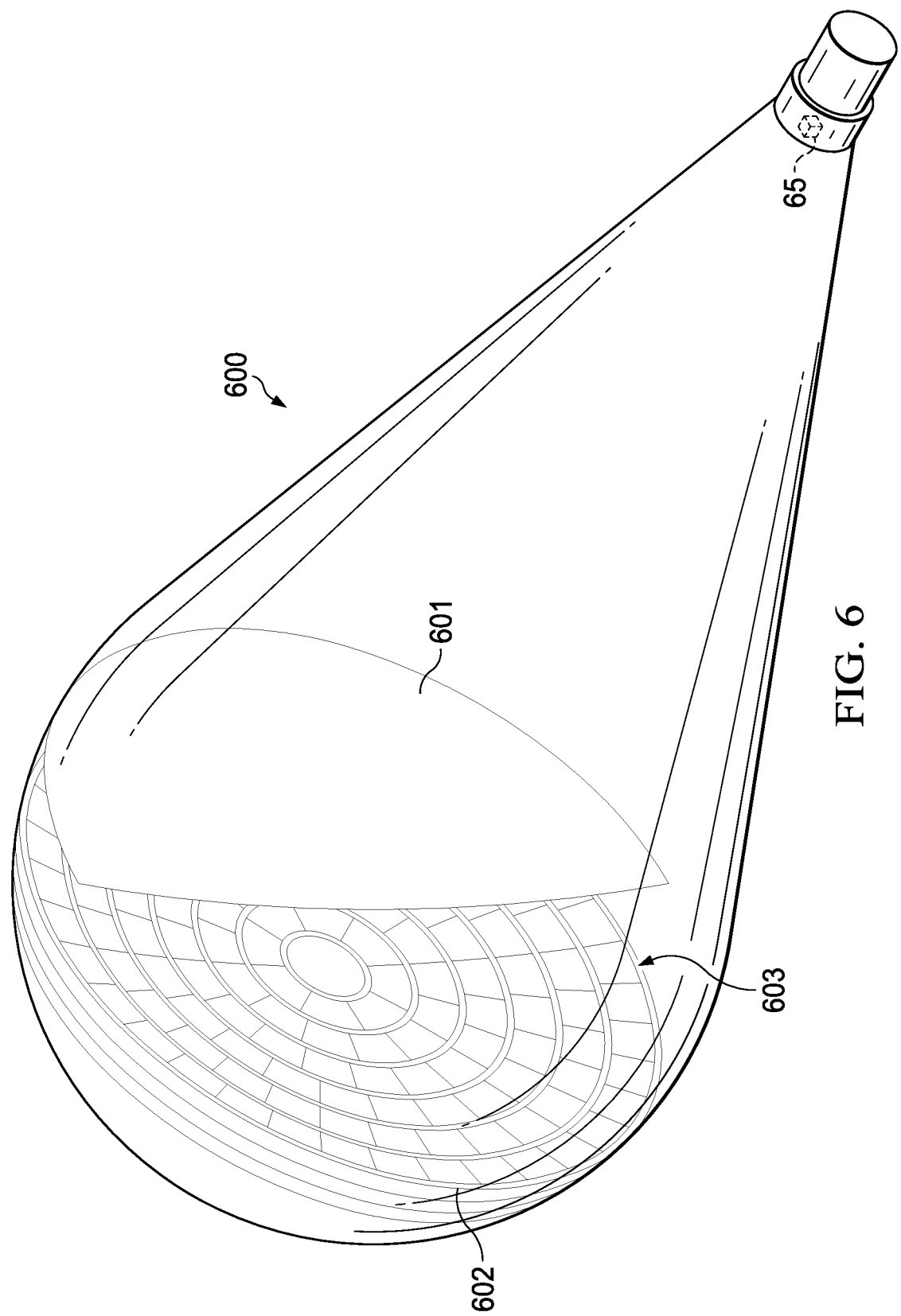
FIG. 6 illustrates the telescope with the addition of an optional membrane and electrode grid for adjusting the reflector shape.

Space-Based Telescope with Inflatable Hull and Reflector and with Reflector Shape Correction FIG. 6 illustrates a telescope 600 that is similar to telescope 100 but is also equipped for shape adjustment of its reflector. Like telescope 100, telescope 600 has a hull with an overcall "ice cream cone" profile and an internal reflector 601.

Telescope 600 allows control of the shape of its reflector 601, using electro-static forces to adjust the curvature of the reflector film. This allows the focus of the reflector 601 to be adjusted.

To this end, a thin film membrane 602 is installed a small distance behind reflector 601 within the hemispherical hull portion. Like reflector 601, membrane 602 is attached circumferentially around the inner surface of the hull. The result is a narrow compartment behind reflector 601. The surface of membrane 602 is patterned to have approximately the same curvature as reflector 610 when telescope 600 is inflated.

In FIG. 6, membrane 602 is partially cut away, to show an electrode grid 603 attached to membrane 602. Electrode grid 603 is flexible and thereby maintains the same shape as membrane 603. In the example of FIG. 6, grid 603 covers substantially the entire surface of membrane 602.

Figure 7:
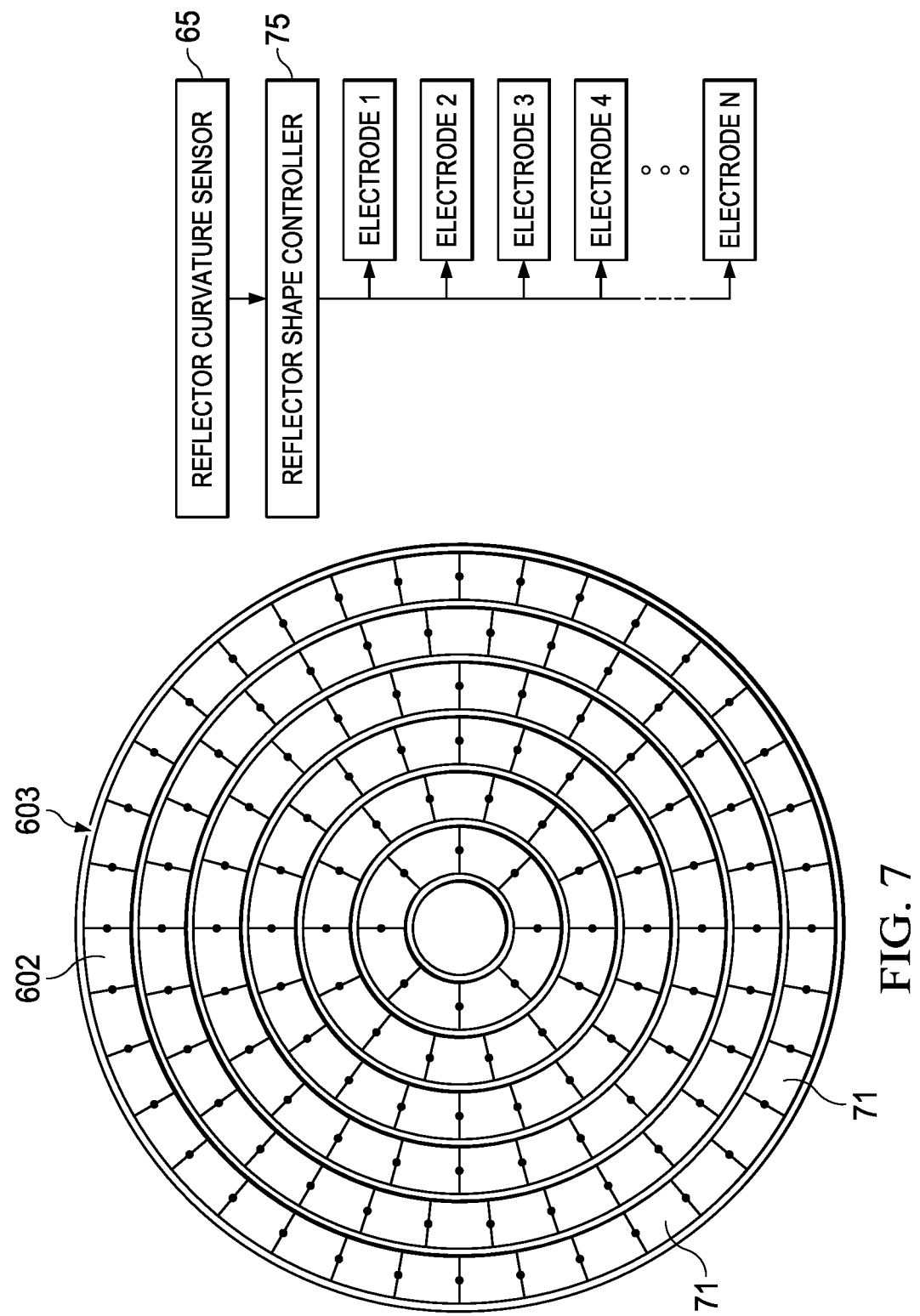
FIG. 7 schematically illustrates the membrane with an electrode grid.

FIG. 7 schematically illustrates membrane 602 and grid 603. Grid 603 is an array of high voltage electrodes 71 that can be used to apply localized force to reflector 601. The electric voltage potential at each electrode 71 is controlled independently. Electrodes 71 are thin metal foil electrodes, electrically isolated from each other, and in the example of this description have a rectangular geometry.

Reflector 601 is coated with a thin conductive layer that acts as a ground plane, so that it can be held at ground potential (zero volts). When electrodes 71 are activated, the potential differences between the electrodes 71 and the conductive coating on reflector 601 produces a force to deflect reflector 601. The conductivity of reflector 601 can be achieved with a metal layer on the reflecting side of reflector 601, which acts as both the reflector and a conducting ground plane. This metalized layer could be two thin layers of different metals if needed for optimum reflection and conduction properties.

Depending on where on how much force is applied, reflector 601 can be made to change shape. More specifically, voltage is applied (or not applied) to each electrode 71 to adjust the local curvature of the reflector 601. Typically, all electrodes 71 are energized, each at a different potential as desired for a given correction to the shape of reflector 601. The result of the applied voltage is an electro-static force between membranes 602 and reflector 601 that is proportional to the differential voltage and the distance between them. The spacing between electrodes 71 can be as large or small as the desired ability to adjust the reflector shape.

Figure 8:
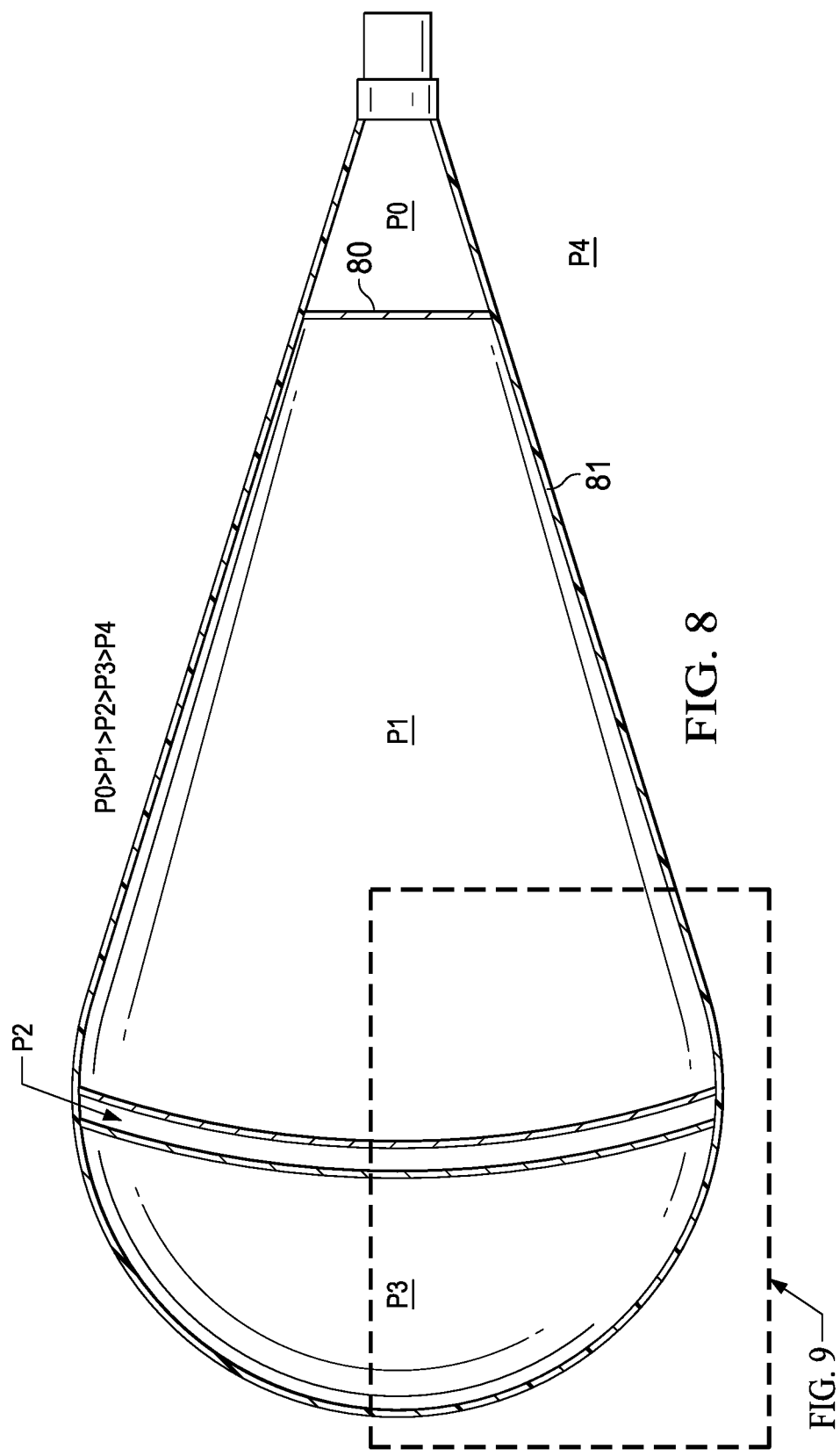
FIG. 8 illustrates the different pressures within the telescope of FIG. 6 when inflated.

FIG. 8 illustrates the inflation scheme for telescope 600. The hull is inflated as described above, to pressures P1 (conical hull portion) and P3 (hemispherical hull portion). The space between reflector 602 and membrane 603 is inflated to pressure P2. Pressure P4 represents the space vacuum. Inflation of each section of telescope 600 is performed such that P1>P2>P3>P4.

If desired, a small volume 80 at the receiver end of telescope 600 can be sectioned off with an additional membrane and inflated to a pressure P0, with P0>P1. A higher pressure in the conical hull portion where it becomes smaller in diameter can help stiffen the hull near its attachment point to receiver 602. This feature may also be added to telescope 100.

Figure 9:
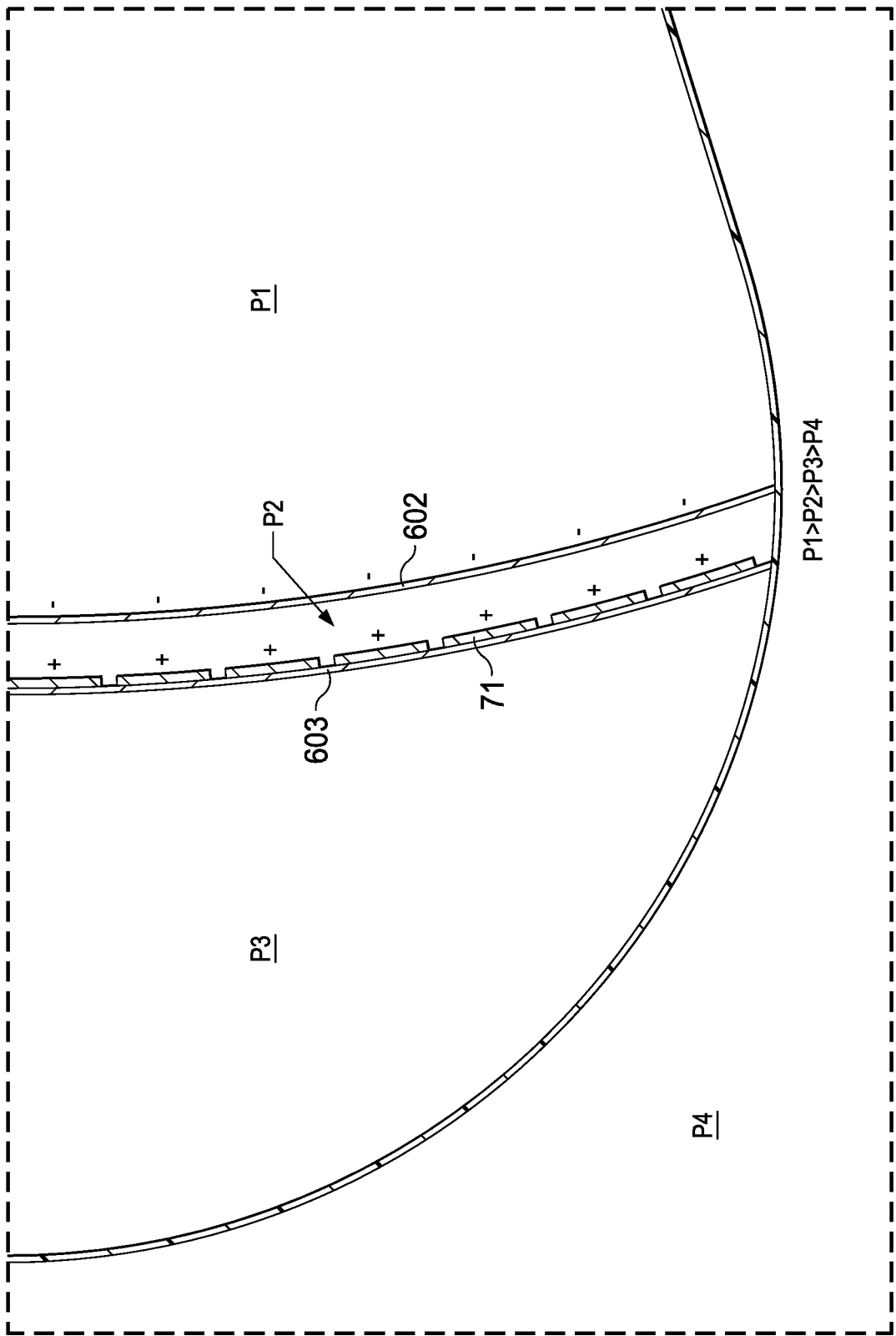
FIG. 9 is a partial cross-sectional view of the reflector and electro-static grid membrane of the telescope of FIG. 6, showing how voltage applied to the membrane's electrodes causes the reflector to change shape.

FIG. 9 is a partial cross-sectional view of reflector 602 and membrane 603, showing how voltage applied to the electrodes 71 of grid 603 creates an electro-static force between membrane 602 and reflector 601. The applied voltage results in a positive charge on membrane 602 and a negative charge on reflector 601. This force causes reflector 601 to move toward membrane 602, thereby changing the curvature of reflector 601. The amount of this charge differential may be varied to result in a desired curvature of reflector 601.

Referring again to FIGS. 6 and 7, one or more curvature sensors 65 measure the curvature of reflector 601. Various methods may be used for measuring curvature. An example of a suitable sensor 65 is a three-dimensional laser profile sensor that measures the distance to a number of discrete points on the surface of reflector 601 using time-of-flight technology. Examples of other sensing methods to determine near real time shape of reflector 601 are time-of-flight sensors, triangulation sensors, structured light sensors, and modulated light sensors.

Sensor(s) 65 are in communication with a reflector shape controller 75, which determines a desired curvature and compares the desired curvature with the curvature measured by sensor(s) 65. Adjustments are made by applying appropriate voltages to the electrodes of grid 603.

In this manner, controller 75 is a real time control system that monitors the reflector shape and adjusts the voltages applied to electrodes 71 as needed to correct and/or change the focus. The curvature adjustments are near real time and provide a method of correcting for manufacturing tolerances in the reflector and distortions in the telescope produced by thermal or internal pressure changes.

What is claimed is:

1. A large reflector inflatable telescope, comprising:
   an inflatable hull, made from flexible film and having a generally conical lower portion and a generally hemispherical upper portion;
   wherein the conical portion is transparent to electromagnetic waves;
   an inner reflector, made from a flexible film and interposed between the conical portion and the hemispherical portion, thereby making the conical portion and the hemispherical portion inflatable at different pressures such that the reflector becomes spherical or parabolic; and
   wherein the reflector is reflective on a surface of the reflector facing into the conical portion.

2. The telescope of claim 1, further comprising an inflation system, operable to separately inflate the conical portion and the hemispherical portion to two different pressures, with the pressure of the conical portion being greater than the pressure of the hemispherical portion.

3. The telescope of claim 2, wherein the inflation system has a means for providing pressurized gas.

4. The telescope of claim 1, further comprising at least one sun shield layer within the hemispherical portion above the reflector, and made from a thin metalized film.

5. The telescope of claim 1, wherein the hull and reflector are foldable and stowable in launch vehicle.

6. The telescope of claim 1, wherein the reflector is reflective due to a reflective coating applied to a surface of the reflector.

7. The telescope of claim 1, further comprising a membrane separating the conical portion of the hull into an upper conical portion and a lower conical portion.

8. The telescope of claim 7, wherein the inflation system is operable to inflate the lower conical portion to a pressure higher than the pressure of the upper conical portion.

9. The telescope of claim 1, further comprising a receiver that receives electromagnetic waves reflected from the reflector and/or transmits electromagnetic waves to be reflected off the reflector.

10. A large reflector inflatable telescope having an adjustable reflector, comprising:
    an inflatable hull, made from flexible film and having a generally conical lower portion and a generally hemispherical upper portion;
    wherein the conical portion is transparent to electromagnetic waves;
    an inner reflector, made from a flexible film and interposed between the conical portion and the hemispherical portion, thereby making the conical portion and the hemispherical portion inflatable at different pressures such that the reflector becomes spherical or parabolic; and
    wherein the reflector is reflective on a surface of the reflector facing into the conical portion, and is electrically conductive;
    a flexible membrane within the hemispherical hull portion and spaced from the reflector to form a compartment behind the reflector;
    an electrode grid covering the surface of the membrane; and
    a reflector adjustment controller operable to electrically activate electrodes of the electrode grid.

11. The telescope of claim 10, further comprising an inflation system, operable to separately inflate the conical portion and the hemispherical portion to two different pressures, with the pressure of the conical portion being greater than the pressure of the hemispherical portion.

12. The telescope of claim 11, wherein the inflation system has a means for providing pressurized gas.

13. The telescope of claim 10, further comprising at least one sun shield layer within the hemispherical portion above the reflector and made from a thin metalized film.

14. The telescope of claim 10, wherein the hull, reflector, and membrane are foldable and stowable in launch vehicle.

15. The telescope of claim 10, wherein the reflector is reflective due to a reflective coating applied to a surface of the reflector.

16. The telescope of claim 10, further comprising a membrane separating the conical portion of the hull into an upper conical portion and a lower conical portion.

17. The telescope of claim 16, wherein the inflation system is operable to inflate the lower conical portion to a pressure higher than the pressure of the upper conical portion.

18. The telescope of claim 10, further comprising a receiver that receives electromagnetic waves reflected from the reflector and/or transmits electromagnetic waves to be reflected off the reflector.

19. The telescope of claim 10, wherein the controller is operable to activate each electrode individually.

20. The telescope of claim 10, further comprising sensors operable to determine a curvature of the reflector, and to deliver data representing the curvature to the controller.

* * * * *